United States Patent Office.

GEORGE HAMILTON SMITH, OF NEW ORLEANS, LOUISIANA, ASSIGNOR TO HIMSELF AND STEPHEN GAY, OF SAME PLACE

Letters Patent No. 102,980, dated May 10, 1870.

IMPROVED MEDICAL COMPOUND.

The Schedule referred to in these Letters Patent and making part of the same.

I, GEORGE HAMILTON SMITH, of the city of New Orleans and State of Louisiana, have invented a certain Medical Compound, to be used as as a remedy or cure for all diseases of the lungs, such as consumption, coughs, and the like.

The nature of my invention consists in making a decoction of the following ingredients, to wit: water, loaf-sugar, dried button or syphalanthus bark, aconite, and the extract of ipecacuanha, in definite and fixed proportions.

To make one hundred and forty-four bottles, containing eight ounces each, of my compound, take six gallons of pure water, seventy-two pounds of loaf-sugar, five pounds of dry bark of the button bush or syphalanthus, one ounce of aconite, and two ounces of the extract of ipecacuanha; put all together in any proper vessel, and boil for three hours; then let the mixture cool, strain and bottle, and my compound is ready for use.

I claim as my invention the manufacture or preparation of a medical compound, of the ingredients, in the proportions, and for the purpose set forth.

GEO. H. SMITH.

Witnesses:
RUFUS R. RHODES,
H. N. JENKINS.